(12) United States Patent
Hettinger

(10) Patent No.: US 6,244,833 B1
(45) Date of Patent: Jun. 12, 2001

(54) DEVICE TO INCREASE SLURRY DENSITY

(76) Inventor: David Allyn Hettinger, 1028 Colleton Way, New Bern, NC (US) 28562

( * ) Notice: Subject to any disclaimer, the term of this patent is extended or adjusted under 35 U.S.C. 154(b) by 0 days.

(21) Appl. No.: 09/648,062

(22) Filed: Aug. 25, 2000

Related U.S. Application Data

(63) Continuation-in-part of application No. 09/369,130, filed on Aug. 4, 1999.

(51) Int. Cl.[7] .................................................. F04B 49/00
(52) U.S. Cl. ......................... 417/282; 417/379; 406/10; 406/14
(58) Field of Search ................................. 417/282, 279, 417/375, 379, 390, 391; 406/10, 12, 14, 32

(56) References Cited

U.S. PATENT DOCUMENTS

| | | | |
|---|---|---|---|
| 3,740,166 | * 6/1973 | Seki et al. ............................. | 417/92 |
| 4,415,296 | * 11/1983 | Funk ..................................... | 406/19 |
| 4,604,037 | * 8/1986 | Hoya ..................................... | 417/394 |
| 4,695,167 | * 9/1987 | Mori et al. ........................... | 366/181 |

\* cited by examiner

*Primary Examiner*—Teresa Walberg
*Assistant Examiner*—Thor Campbell

(57) ABSTRACT

Disclosed is a device and method to increase density of slurry transported by slurry pumping systems. A connection is made to the existing slurry pipeline so that a portion of slurry is drawn into the device. Multiple settling chambers are filled and pressurized by the slurry. Settling in these chambers segregates the processed slurry into a high density stream and a low density stream. The low density stream is returned to the slurry make up area. The high density stream is returned to mix with the unprocessed slurry remaining in the existing slurry pipeline. A computer processor controls the amount of low density slurry withdrawn so that the final slurry density and slurry velocity meet set point values.

11 Claims, 2 Drawing Sheets

DEVICE TO INCREASE SLURRY DENSITY
FIGURE ONE
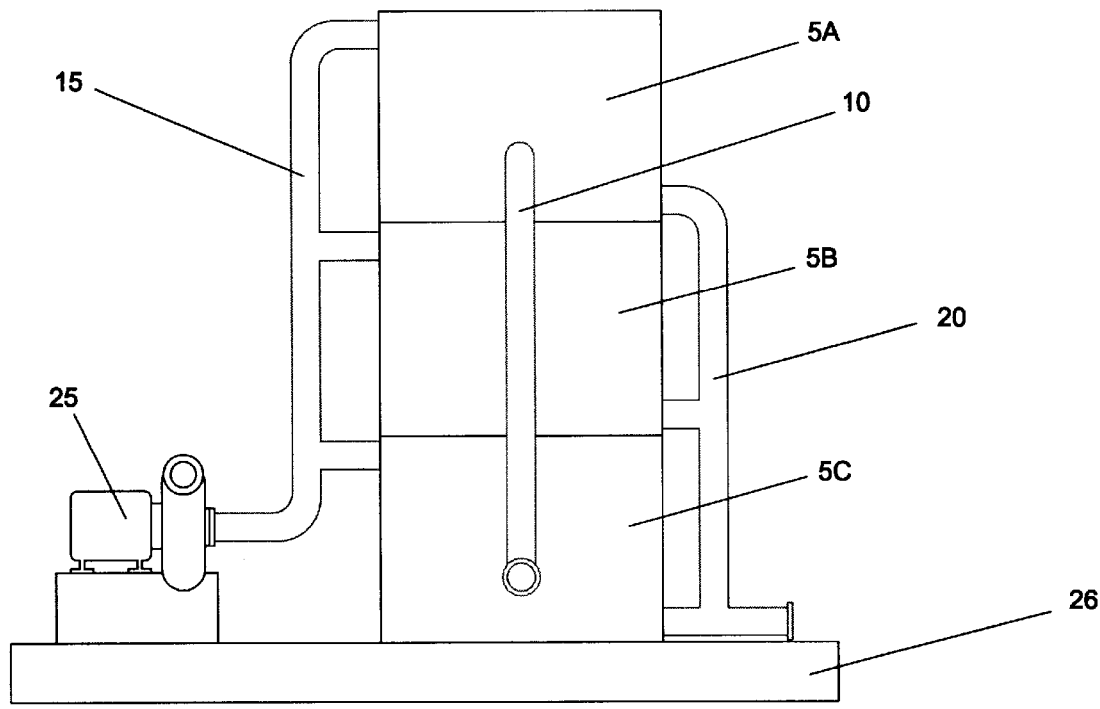

DEVICE TO INCREASE SLURRY DENSITY
FIGURE TWO
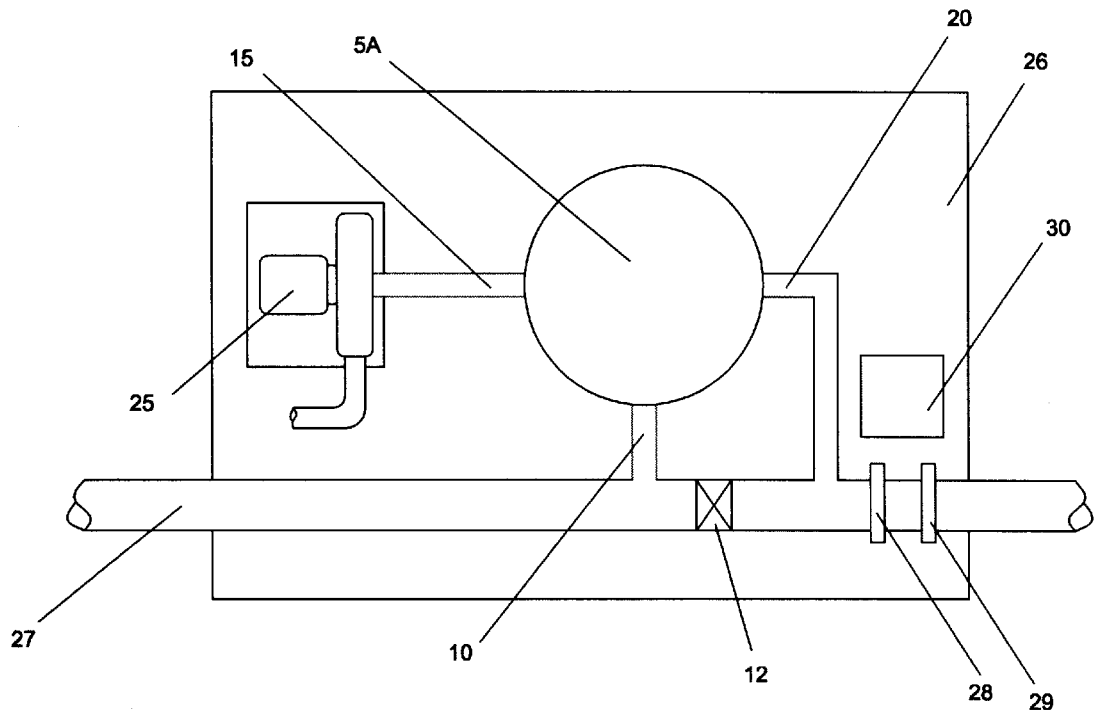

DEVICE TO INCREASE SLURRY DENSITY

This is a continuation in part of Ser. No. 09/369,130, filed Aug. 04, 1999.

BACKGROUND

1. Field of Invention

This invention relates in general to the field of slurry pumping systems and, in particular, to a novel method to increase the solids to fluid ratio of the slurries pumped.

2. Description of Prior Art

Slurry pumping systems are used throughout industry to transport bulk solids materials. Slurry is defined as a mixture of particulate solid material and some liquid that is used as the carrier (transport) fluid. Materials transported by slurry methods include sand, gravel, coal, ore, earthy materials, sewerage sludge, vegetables, and other materials. Within the slurry pumping industry, the term "slurry density" refers to the ratio of solids weight to total slurry weight. That term is used within this patent application.

Slurry density is one of the primary determinants of the energy efficiency of the slurry pumping system. For each system, there is an ideal slurry density which is a complex function of pipeline diameter, solid particle density, solid particle size distribution, carrier fluid density, carrier fluid viscosity, and other factors. Pumping systems that operate with below optimum slurry density waste energy by pumping excessive amounts of carrier fluid.

Many slurry systems are operated below the optimum slurry density. This situation frequently occurs because the intake pump cavitates when "suction head required" for dense slurry exceeds the "suction head available" from the intake pump. Low intake slurry density also frequently occurs in sluice mining operations where mining water requirements are greater than optimum transport water requirements.

Several gravitational settling devices have been proposed in which the slurry is directed to a large settling basin where the solids settle to the bottom and are withdrawn under controlled environments. Refer to U.S. Pat. No. 3,870,373 "Underground Coal Slurry Concentrating Sump", U.S. Pat. No. 3,924,895 "Method and Apparatus for Hydraulic Transportation of Coal", U.S. Pat. No. 3,942,841 "Slurry Handling System", and U.S. Pat. No. 3,981,541 "Shallow Underground Coal Slurry Concentration Sump". These methods are not preferred for two reasons. Firstly, the designs make no effort to minimize the size of the settling basins. In cases where a large portion of the solids is comprised of very small particles, the described settling basins would be very large. In these cases, the described settling basins could not be portable and therefore could not be kept adjacent to the mining activity. Secondly, all of the described basins are open to atmosphere so that all of the incoming slurry pressure energy is lost when it is delivered to the settling basin. Therefore, it is seen that these simple settling basins are not satisfactory when a mobile, energy efficient means to increase slurry density is required.

U.S. Pat. No. 4,415,296 "Materials Transfer System and Methodology" overcomes the energy efficiency objection described in the previous paragraph. The "separating device" is maintained under the pressure of the "transfer device" and thus does not lose this energy. However, U.S. Pat. No. 4,415,296 provides no criteria to teach design of the separating device beyond conventional equipment-screens, hydrocyclones, and settling tanks. These equipment units would be too large for easy mobility. Hydrocyclone equipment and screen equipment would be very large because all of the flow discharged by the "transfer device" is treated and because most ore slurries will contain a wide range of particle sizes that will necessitate multiple stages of processing. Conventional settling tanks would have to be large when treating the full slurry volume. Furthermore, conventional settling tanks are constructed as one large diameter tank that would be very heavy in order to be strong enough to withstand the pumping system operating pressure. The device taught by U.S. Pat. No. 4,415,296 does not provide protection against plugging the downstream pipeline due to inadequate slurry velocity. When the intake pump discharges an interval of very low density slurry the device of U.S. Pat. No. 4,415,296 could divert too much slurry away from the downstream pipeline. In this case, the controller should limit the amount of slurry diverted in order to maintain a pre-set minimum slurry velocity.

OBJECTS AND ADVANTAGES

Accordingly, the present invention has several objects and advantages:

a) to provide a device and system whereby slurry density from existing pumping systems can be increased; and, b) to provide a means to prevent said slurry density controller from increasing slurry density above a pre-determined limit; and, c) to provide a means to prevent said controller from reducing slurry velocity to below the minimum and causing plugging of downstream pipelines; and, d) to provide said controller and system such that pressure energy of the incoming slurry is not vented to atmospheric pressure.

Further objects and advantages of the present invention will become apparent from a consideration of the ensuing description and drawings.

DRAWING FIGURE

FIG. 1 provides a side view and

FIG. 2 provides a plan view of a Device to Increase Slurry Density.

REFERENCE NUMERALS IN DRAWINGS

5A–5C. Settling Tank
10. Slurry Intake Manifold
12. Slurry Intake Control Valve
15. Low Density Discharge Manifold
20. High Density Discharge Manifold
25. Low Density Discharge Pump
26. Equipment Sled
27. Slurry Pipeline
28. Slurry Density Measuring Device
29. Slurry Velocity Measuring Device
30. Computer Processor

SUMMARY

In accordance with the present invention, a Device To Increase Slurry Density is comprised of a means to draw a portion of slurry from Slurry Pipeline 27, multiple Settling Tanks 5 that cause most of the solids in that slurry to collect for transfer back to Slurry Pipeline 27 as a high density slurry, and a means to remove low density slurry from the top of Settling Tanks 5. All elements of slurry flow remain under pressure from Slurry Pipeline 27. Computer Processor 30 controls the rate of low density slurry removal so the mixture of high density slurry from Settling Tank 5 and the untreated slurry in Slurry Pipeline 27 is near slurry density and slurry velocity set points.

Description—Preferred Embodiment: FIG. 1

A typical embodiment of a Device To Increase Slurry Density is shown in side view in Figure One and in plan view in Figure Two.

Settling Tank 5 is a totally enclosed vessel capable of withstanding full operating pressure of the existing slurry system to which the Device To Increase Slurry Density is attached. Settling Tank 5 is preferably a round tank with flat top and bottom for ease of construction, strength of construction, and avoidance of eddy currents inside the tank. Other shapes can also be used.

As shown in Figure One, multiple units of Settling Tank 5 may be stacked. Slurry Intake Manifold 10 interconnects each Settling Tank 5 with Slurry Pipeline 27. High Density Discharge Manifold 20 connects each Settling Tank 5 with Slurry Pipeline 27. Low Density Discharge Manifold 15 connects each Settling Tank 5 with Low Density Discharge Pump 25. In this manner, very large flow rates can be treated in the Device to Increase Slurry Density while keeping the flow rate through each Settling Tank 5 small enough to allow light weight settling basin design. The importance of this feature may be demonstrated by considering that vertical forces in the enclosed Settling Tank 5 will vary as the square of tank diameter. That is, vertical forces in a 25 foot diameter Settling Tank 5 will be 25 times greater than vertical forces in a 5 foot diameter Settling Tank 5.

As shown in Figure Two, Slurry Intake Manifold 10 is connected to Slurry Pipeline 27 on the high pressure side of Slurry Intake Control Valve 12. High Density Discharge Manifold 20 is connected to Slurry Pipeline 27 on the low pressure side of Slurry Intake Control Valve 12. It may be seen that only a portion of the slurry flowing in Slurry Pipeline 27 will be diverted to flow through the Device to Increase Slurry Density while the remaining portion flows through Slurry Intake Control Valve 12. Slurry from High Density Discharge Manifold 20 and the untreated slurry from Slurry Pipeline 27 are blended on the low pressure side of Slurry Intake Control Valve 12. This feature of diverting only a portion of the slurry from Slurry Pipeline 27 is important to the design goal of minimizing the size of the Device To Increase Slurry Density equipment by minimizing the turbulence of the intake slurry stream.

Slurry Intake Control Valve 12 may be a pipeline valve such that a relatively closed position causes greater slurry volume to divert into the Device to Increase Slurry Density. Alternately Slurry Intake Control Valve 12 may be a section of pipeline with smaller diameter than Slurry Pipeline 27. Alternately, Slurry Intake Control Valve 12 may be a flow control orifice of the type typically used to balance flows in hydraulic systems.

As shown in Figure Two, Slurry Density Measuring Device 28 and Slurry Velocity Measuring Device 29 are provided on Slurry Pipeline 27, downstream of the Device To Increase Slurry Density. Computer Processor 30 receives data from Slurry Density Measuring Device 28 and Slurry Velocity Measuring Device 29 and controls the operation of the Device To Increase Slurry Density as described in the following section. Slurry Density Measuring Device 28, Slurry Velocity Measuring Device 29, and Computer Processor 30 are commonly known equipment units.

As shown in Figures One and Two, Low Density Discharge Manifold 15 is connected to Low Density Discharge Pump 25. Low Density Discharge Pump 25 is a variable speed pump capable of boosting the pressure of Low Density Discharge slurry from the operating pressure of Settling Tank 5 to the operating pressure of the existing slurry make-up water system. It is noted that the Device to Increase Slurry Density is designed to allow some solid particles to report to the overflow port for return to the slurry make-up area. This feature is important to the design goal of minimizing the size of the Device to Increase Slurry Density equipment.

The specific design of the components of the Device to Increase Slurry Density is dependent on the characteristics of the existing slurry pumping system. The difference between the existing slurry density and the desired slurry density determines the volume of water to be removed through Low Density Discharge Manifold 15. The particle size distribution of the existing slurry determines the maximum velocity of water rising through Settling Tank 5 to discharge through Low Density Discharge Manifold 15. The combination of determined Low Density Discharge volume and determined maximum upward velocity allows determination of the minimum cross sectional area of Settling Tank 5. An example of component design based on an existing phosphate slurry pumping system is provided below.

The example slurry pumping system provides 1,680 tons per hour in 15,000 gallons per minute of slurry that is 35 percent solids (specific gravity equal 2.65) by weight. It is desired to increase the slurry density to 45 percent solids by weight.

The size distribution of the example slurry is such that 84% of the solids have diameters greater than 150 microns. It is desired to design Settling Tank 5 such that all of these particles report to High Density Discharge Manifold 20 for return to Slurry Pipeline 27. It is well known to persons knowledgeable in the science of slurry pumping that these 150 microns particles will settle at a velocity of 0.0272 feet per second.

Slurry Intake Control Valve 12 will be positioned to cause 9,800 gallons per minute of the slurry from Slurry Pipeline 27 to be diverted into the Device to Increase Slurry Density. The remaining 5,200 gallons per minute remains in Slurry Pipeline 27 and is not treated.

9,800-GPM of 35% solids slurry provides solids mass flow of 1,098 tons per hour. 84% (922-TPH) of the solids are larger than 150 microns and will be caused to settle in Settling Tank 5 and discharge through High Density Discharge Manifold 20. 16% (176-TPH) of the solids are smaller than 150 microns and will be evenly distributed in Settling Tank 5.

Discharging 4,800-GPM through Low Density Discharge Manifold 15 will account for 49% of the total slurry volume treated by the Device to Increase Slurry Density. This Low Density Discharge of 4,800-GPM will also contain 49% of the particles less than 150 microns in diameter, a total mass flow of 86-TPH at 7% solids by weight. This mass flow accounts for 5% of the total slurry mass flow in Slurry Pipeline 27 before treatment with the Device to Increase Slurry Density.

The remaining 51% of treated slurry (5000-GPM) will contain the remaining 51% of the particles less than 150 microns in diameter, a total mass flow of 90-TPH. These fine particles will combine with the 922-TPH of particles greater than 150 micron diameter to yield a total High Density Discharge of 1,012-TPH in 5,000-GPM of slurry of 54% solids by weight.

The 5000-GPM, 54% solids slurry discharged through High Density Discharge Manifold 20 will mix with the 5,200-GPM, 35% solids slurry that was not treated by the Device to Increase Slurry Density. The resulting slurry mix is 10,200 gallons per minute at 45% solids by weight and containing 1,594 tons per hour.

To achieve this material balance the upward velocity in Settling Tank 5 must be less than 0.0272 feet per second, the settling velocity of 150 micron particles. The diameter of Settling Tank 5 is set at five feet, a size which can accommodate working pressure of the pumping system without excessively heavy construction. The maximum Low Density Discharge volume per unit is therefore calculated to be 240-GPM. Therefore, a total of 20 Settling Tanks 5 are required for the total 4,800-GPM of Low Density Discharge. In this instance, a reasonable equipment package can be designed with four sets of five Settling Tanks 5 stacked in columns and mounted on a common Equipment Sled 25.

The foregoing statistics and calculations are illustrative of the design concept and are not intended to be restrictive to the capacity, input slurry density, output slurry density, volume of process streams, size of Settling Tank 5, or any other particulars of the Device to Increase Slurry Density.

The height of Settling Tank 5 must be sufficient to create a quiescent zone between the turbulence zones caused by eddy currents around the entrance and exits of the three input and output streams. This height will be dependent on the effectiveness of designs in minimizing turbulence of the input and output streams. This fact highlights the importance of diverting only a portion of the slurry from Slurry Pipeline 27. Figures One and Two indicate single points of inlet and outlet in order to simplify the drawings; however, more sophisticated piping systems with multiple ports distributed about the perimeter of Settling Tank 5 can easily be incorporated. The height of Settling Tank 5 will be experimentally determined.

Operation—Preferred Embodiment: FIG. 1

As shown in Figure Two, the Device to Increase Slurry Density is connected to Slurry Pipeline 27. Slurry Intake Manifold 10 is connected to Slurry Pipeline 27 on the high pressure side of Slurry Intake Control Valve 12. High Density Discharge Manifold 20 is connected to Slurry Pipeline 27 on the low pressure side of Slurry Intake Control Valve 12. Whenever slurry is flowing in Slurry Pipeline 27, a portion of that slurry will be diverted into the Device to Increase Slurry Density by Slurry Intake Control Valve 12. All components of the Device to Increase Slurry Density will be filled and pressurized by the slurry.

Note that two important design features of the Device to Increase Slurry Density are demonstrated at this step in the process. Firstly, the slurry is kept under pressure during processing by the Device to Increase Slurry Density and most of the energy of the incoming slurry is preserved. Secondly, as shown in the example of the preceding section, approximately one-third of the slurry flowing in Slurry Pipeline 27 is allowed to by-pass the Device to Increase Slurry Density. This feature reduces the turbulence of entrance and exit flows within Settling Tank 5 and allows for more compact equipment design.

Slurry diverted from Slurry Pipeline 27 flows through Slurry Intake Manifold 10 and is distributed to multiple Settling Tanks 5. The Device to Increase Slurry Density divides the total volume of slurry processed into several smaller streams so that the cross sectional area of Settling Tanks 5 may be kept small. This is very important with regard to keeping the weight of the equipment to a minimum; it can be calculated that vertical stress in Settling Tank 5 will vary as the square of tank diameter.

If Low Density Discharge Pump 25 is not operating, all of the slurry diverted through Slurry Intake Manifold 10 will flow through Settling Tanks 5 and report to High Density Discharge Manifold 20. This slurry will have the same density as the slurry in Slurry Pipeline 27 and the Device to Increase Slurry Density will have no effect on the slurry density.

As shown on Figure Two, Computer Processor 30 will receive data from Slurry Density Measuring Device 28 and Slurry Velocity Measuring Device 29 installed on Slurry Pipeline 27 immediately down stream of the Device to Increase Slurry Density. These instruments monitor the density and velocity parameters of the final slurry product after treatment by the Device to Increase Slurry Density.

When the slurry density in Slurry Pipeline 27 falls below a "set point" value and when the slurry velocity is above a "set point" value, the Computer Processor 30 will cause Low Density Discharge Pump 25 to operate. This statement illustrates that the Device to Increase Slurry Density will not cause pipeline plugging by removing Low Density slurry and causing low slurry velocity in Slurry Pipeline 27.

Operation of Low Density Discharge Pump 25 will cause a portion of the slurry in Settling Tanks 5 to discharge through Low Density Discharge Manifold 15. Because Settling Tanks 5 have a large cross sectional area, only very small solid particles in the slurry will rise to the top of Settling Tanks 5 and be drawn out with the slurry discharged through Low Density Discharge Manifold 15. In the example design calculation of the preceding section it was shown that 5% of the solids discharged from the slurry make-up area will be removed from the slurry in Slurry Pipeline 27. Note that this product is not lost because it is returned to the slurry make-up area. This recycling feature of the Device to Increase Slurry Density is very important to the compact nature of the equipment design. That is, designs to eliminate this recycling would require Settling Tanks 5 to have much larger diameters.

Most of the solids will be discharged through High Density Discharge Manifold 20. The design example provided in the preceding section showed the High Density Discharge will be approximately 54% solids by weight. This slurry is returned to Slurry Pipeline 27 where it is mixed with the portion of slurry that by-passed the Device to Increase Slurry Density. The slurry density of the final mixture is the volumetric weighted average of the density of these two streams. In the design example of the preceding section, it was shown that the final slurry density was 45% solids by weight.

The Computer Processor 30 will continue to increase the speed of variable speed Low Density Discharge Pump 25 until the slurry density measured by Slurry Density Measuring Device 28 increases to meet the set point value or until the slurry velocity measured by Slurry Velocity Measuring Device 29 decreases to meet the set point value.

Description and Operation—Alternative Embodiment: Low Density Discharge Control Pump with Control Valve In the preferred embodiment, variable speed Low Density Discharge Pump 25 is specified as a means to control the volume of slurry decanted from the top of Settling Tank 5. Alternately, it is possible to use a constant speed Low Density Discharge Pump 25. In this case, placing a Control Valve between Low Density Discharge Pump 25 and the existing slurry make-up water system allows control of the rate of Low Density Discharge. The Computer Processor 30 would cause said Control Valve to become relatively more open when slurry density in Pipeline 27 is below the set point. The Computer Processor 30 would cause said Control Valve to become relatively more closed when slurry density in Pipeline 27 is above the set point.

Description and Operation—Alternative Embodiment: Low Density Discharge Control Valve The preferred embodiment specifies Low Density Discharge Pump 25 as means to increase the pressure of Low Density Discharge from the operating pressure of the Device to Increase Slurry Density to the operating pressure of the existing slurry make-up water system. In cases where the operating pressure of the Device to Increase Slurry Density is higher than the operating pressure of the existing slurry make-up water system, a Control Valve can be substituted for Low Density Discharge Pump 25. The Computer Processor 30 would cause said Control Valve to become relatively more open when slurry density in Slurry Pipeline 27 is below the set point. The Computer Processor 30 would cause said Control Valve to become relatively more closed when slurry density in Slurry Pipeline 27 is above the set point.

Description and Operating—Alternative Embodiment: High Density Discharge Volume Control.

The preferred embodiment specifies that the relative volumes of the low density and high density slurry streams withdrawn from Settling Tanks 5 is controlled by a variable speed pump on the Low Density Manifold. Alternately, a variable speed pump operating on the High Density Manifold could be used to control the relative flow rates of the low density and high density slurry streams.

Alternately, a pump operating on the High Density Manifold may be a single speed pump and flow control can be provided by positioning of a control valve installed between the High Density pump and Slurry Pipeline 27.

It is also possible to control the relative volume of High Density Slurry by installing a control valve on the High Density Manifold without utilizing a high density pump of any kind.

Description and Operation—Alternative Embodiment: Open Tank Design

In some cases, the energy losses caused by venting the processed slurry to atmosphere may be insignificant. In such case, it may be desirable to construct Settling Tank 5 as a conventional thickener tank with an open top. The principles of controlling final slurry density by removing a portion of low density slurry from the top of Settling Tank 5 remains the same.

Description and Operation—Alternative Embodiment: Single Settling Tank

The preferred embodiment specifies multiple small Settling Tanks 5 as a design method to keep the size of the equipment small. In some cases, it might be preferred to utilize a single Settling Tank 5. The principle operation of the Device to Increase Slurry Density remains the same.

Description and Operation—Alternative Embodiment: Processing Means

The preferred embodiment specifies multiple Settling Tanks 5 as the means for segregating processed slurry into high density and low density streams. It is also possible to process the slurry with other equipment such as hydrocyclones, screens, centrifuges and a combination of such devices to achieve the same affect.

Conclusion, Ramification, and Scope of Invention

Thus, the described invention provides a means to increase the density of slurry discharged by existing slurry pumping systems. The described process minimizes the size of process equipment by diverting and processing only a portion of the total existing slurry flow. The described equipment further minimizes the size of the equipment by dividing the processed slurry into multiple small settling tanks. The described equipment includes means to measure the density and velocity of the resulting slurry and to adjust operation of the equipment to maintain desired performance in changing conditions. The described invention also is designed to operate on the existing slurry flow without significant loss of the pressure energy of that slurry.

While the description above provides many specifics, these should not be construed as limitations on the scope of the invention, but rather as exemplification of one embodiment and the described alternative embodiments. Many other variations are possible. For instance, many different inlet and outlet distributors may be devised and differing slurry characteristics and mass flow considerations may favor designs other than those specified. In addition, the shape of Settling Tank 5 may be varied from the described round tank. Materials of construction are not specified and are not limitations in scope. The description provides that Low Density slurry is returned to the slurry make-up area; however, this is not required for operation of the Device to Increase Slurry Density and alternate processing means may be provided for this material. Accordingly, the scope of the invention should be determined not by the embodiments illustrated, but by the appended claims and their legal equivalents.

I claim:

1. A method of increasing the density of slurry transported in a slurry pipeline comprising the steps of:
   A. splitting the initial slurry into streams of one or more treated slurry streams and an untreated slurry stream; and,
   B. processing said treated slurry streams in one or more separating devices to form zones of low density slurry and zones of high density slurry; and,
   C. removing low density slurry streams from said zones of low density slurry; and,
   D. transporting said low density slurry streams to alternate processing equipment; and,
   E. removing high density slurry streams from said zones of high density slurry; and,
   F. mixing said high density slurry streams with said untreated slurry stream to form a final transport slurry stream; and,
   G. monitoring slurry density and slurry velocity of said final transport slurry stream; and,
   H. controlling relative flow rates of said untreated slurry stream, said treated slurry streams, said low density slurry streams, said high density streams, and said final transport slurry stream such that:
      a) the density of said final transport slurry stream is maximized without exceeding a predetermined maximum density; and,
      b) the velocity of said final transport slurry stream does not fall below a predetermined minimum velocity.

2. A device for increasing the density of slurry transported in a slurry pipeline comprising:
   A. a connecting means to said slurry pipeline such that:
      a) a portion of the initial slurry in said slurry pipeline remains in said slurry pipeline as an untreated slurry stream and continues to flow downstream of said connecting means; and,
      b) a portion of said initial slurry in said slurry pipeline is diverted as a treated slurry stream; and,
      c) said connecting means can be adjusted to vary the relative flow rate of said treated slurry stream between 0% and 100% of said initial slurry; and,
   B. a means to process said treated slurry stream such that:
      a) said means to process is pressurized by said treated slurry stream; and,
      b) a zone of low density slurry and a zone of high density slurry is formed within said means to process; and,
   C. a means to controllably withdraw said low density slurry and said high density from said means to process such that:
      a) a low density slurry stream is withdrawn from said zone of low density slurry and diverted to alternative processing facilities; and,
      b) the remaining treated slurry is withdrawn as a high density slurry stream, returned to said slurry pipeline and mixed with said untreated slurry stream flowing downstream of said connecting means to form a final transport slurry stream; and,
   D. a means to monitor density and velocity of said final transport slurry stream; and,
   E. a means to automatically and continuously control relative flow rates of said untreated slurry stream, said treated slurry stream, said low density slurry stream, and said high density slurry stream such that:
      a) a computer processor increases the relative flow rate of said low density slurry stream withdrawn when density in said final transport slurry stream is below a predetermined density set point; and,
      b) said computer processor decreases the relative flow rate of said low density slurry stream withdrawn when density in said final transport slurry stream is above a predetermined density set point; and,
      c) said computer processor decreases the relative flow rate of said low density slurry stream withdrawn when velocity of said final transport slurry stream is below a predetermined velocity set point.

3. A device for increasing the density of slurry transported in a slurry pipeline as recited in claim 2 wherein said means to process is comprised of one or more hydrocyclones.

4. A device for increasing the density of slurry transported in a slurry pipeline as recited in claim 2 wherein said means to process is comprised of one or more settling tanks.

5. A device for increasing the density of slurry transported in a slurry pipeline as recited in claim 2 wherein said means to process is comprised of one or more screens.

6. A device for increasing the density of slurry transported in a slurry pipeline as recited in claim 2 wherein said means to process is comprised of a combination of said hydrocyclones, said settling tanks, and said screens.

7. A device for increasing the density of slurry transported in a slurry pipeline as recited in claim 2 wherein said means to process is vented to atmosphere.

8. A device for increasing the density of slurry transported in a slurry pipeline as recited in claim 2 wherein said means to controllably withdraw said low density slurry stream from said means to process is comprised of:
   A. a low density pipeline connection to said zone of low density slurry; and,
   B. a low density discharge pipeline connection to said alternate processing facilities; and,
   C. a variable speed slurry pump connected between said low density pipeline connection and said low density discharge pipeline such that higher speed operation of said slurry pump increases the withdrawal flow rate of said low density slurry stream and such that lower speed operation of said slurry pump decreases the withdrawal flow rate of said low density slurry stream.

9. A device for increasing the density of slurry transported in a slurry pipeline as recited in claim 2 wherein said means to controllably withdraw said low density slurry stream from said means to process is comprised of:
   A. a low density pipeline connection to said zone of low density slurry; and,
   B. a low density discharge pipeline connection to said alternate processing facilities; and,
   C. a control valve connected between said low density pipeline connection and said low density discharge pipeline such that increasing the opening of said control valve increases the withdrawal flow rate of said low density slurry stream and such that decreasing the opening of said control valve decreases the withdrawal flow rate of said low density slurry stream.

10. A device for increasing the density of slurry transported in a slurry pipeline as recited in claim 2 wherein said means to controllably withdraw said high density slurry stream from said means to process is comprised of:
   A. a high density pipeline connection to said zone of high density slurry; and,
   B. a high density discharge pipeline connection to said slurry pipeline; and,
   C. a variable slurry pump connected between said high density pipeline connection and said high density discharge pipeline such that higher speed operation of said slurry pump increases the withdrawal flow rate of said high density slurry stream and such that lower speed operation of said slurry pump decreases the withdrawal flow rate of said high density slurry stream.

11. A device for increasing the density of slurry transported in a slurry pipeline as recited in claim 2 wherein said means to controllably withdraw said high density slurry from said means to process is comprised of:
   A. a high density pipeline connection to said zone of high density slurry; and,
   B. a high density discharge pipeline connection to said slurry pipeline; and,
   C. a control valve connected between said high density pipeline connection and said high density discharge pipeline such that increasing the opening of said control valve increases the withdrawal flow rate of said high density slurry stream and such that decreasing the opening of said control valve decreases the withdrawal flow rate of said high density slurry stream.

* * * * *